(12) United States Patent
Park et al.

(10) Patent No.: US 10,448,160 B2
(45) Date of Patent: Oct. 15, 2019

(54) PORTABLE SOUND EQUIPMENT

(71) Applicant: LG ELECTRONICS INC., Seoul (KR)

(72) Inventors: Siyoung Park, Seoul (KR); Donghan Kim, Seoul (KR); Shin Han, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 16/040,047

(22) Filed: Jul. 19, 2018

(65) Prior Publication Data

US 2019/0058951 A1 Feb. 21, 2019

(30) Foreign Application Priority Data

Aug. 18, 2017 (KR) .................. 10-2017-0104620

(51) Int. Cl.
*H04R 5/033* (2006.01)
*H04B 1/08* (2006.01)
(Continued)

(52) U.S. Cl.
CPC .......... *H04R 5/0335* (2013.01); *H04B 1/034* (2013.01); *H04B 1/08* (2013.01); *H04B 1/385* (2013.01); *H04M 1/6066* (2013.01); *H04R 1/08* (2013.01); *H04R 1/105* (2013.01); *H04R 1/1016* (2013.01); *H04R 1/1041* (2013.01); *H04R 1/1091* (2013.01); *H01Q 1/273* (2013.01);
(Continued)

(58) Field of Classification Search
CPC ..... H04M 1/6066; H01Q 1/273; H04R 1/105; H04R 1/1016; H04R 1/1066; H04R 5/0335
See application file for complete search history.

(56) References Cited

U.S. PATENT DOCUMENTS 9,055,795 B2 * 6/2015 Larkin .................. A45C 11/00
9,635,450 B2 * 4/2017 Drinkwater ........... G06F 1/1605
(Continued)

FOREIGN PATENT DOCUMENTS

| JP | 2010-166258 A | 7/2010 |
|---|---|---|
| KR | 10-1362334 B1 | 2/2014 |
| KR | 10-1365926 B1 | 2/2014 |

*Primary Examiner* — Brian Ensey
(74) *Attorney, Agent, or Firm* — Birch, Stewart, Kolasch & Birch, LLP

(57) ABSTRACT

There is disclosed a portable sound equipment comprising a support body formed in a gentle curve; electronic bodies provided in both ends of the support body, respectively, and exhaustible from the support body and rotatable to be folded or unfolded in an exhausted state; and a hinge unit configured to provide a shaft for the rotation, wherein the hinge unit comprises a connection portion projected from one end of the support body; a hinge rotatably coupled to the connection portion; a cylinder connected to the hinge and loaded in the electronic body; and a hinge spring having one end fixed to the cylinder and the other end supporting the electronic body to generate a restoring force which makes the exhausted electronic bodies become drawn into the support body, and when the electronic bodies are drawn into the support body is caught in the connection portion with respect to the rotational direction.

10 Claims, 10 Drawing Sheets

(51) Int. Cl.
*H04M 1/60* (2006.01)
*H04R 1/08* (2006.01)
*H04R 1/10* (2006.01)
*H04B 1/034* (2006.01)
*H04B 1/3827* (2015.01)
*H01Q 1/27* (2006.01)
*H04R 5/027* (2006.01)

(52) U.S. Cl.
CPC ............ *H04R 1/1066* (2013.01); *H04R 5/027* (2013.01); *H04R 2201/105* (2013.01); *H04R 2201/107* (2013.01); *H04R 2420/07* (2013.01)

(56) References Cited

U.S. PATENT DOCUMENTS

| | | |
|---|---|---|
| 2015/0112153 A1 | 4/2015 | Nahum |
| 2015/0245124 A1 | 8/2015 | Lee |

\* cited by examiner (a)

(b)

(a)

(b)

PORTABLE SOUND EQUIPMENT

CROSS-REFERENCE TO RELATED APPLICATIONS

This application claims priority to Korean Patent Application No. 10-2017-0104620 filed on Aug. 18, 2017 in Korea, the entire contents of which is hereby incorporated by reference in its entirety.

BACKGROUND OF THE DISCLOSURE

Field of the Disclosure

Embodiments of the present disclosure relate to a portable sound equipment which may transceive an audio signal with a terminal wirelessly and control the terminal based on the signal input via a user input unit.

Background of the Disclosure

Portable sound equipment means a sound device configured to receive an audio signal from a terminal and transmit the information about the sound collected via a microphone to the terminal. A conventional portable sound equipment is usually a wire type configured to receive an audio signal after linked with an ear jack of a terminal unit via a terminal. In recent, there are increasing demands for wireless communication type wireless sound equipment because of mobility and usability.

The portable sound equipment includes an audio output module to perform several functions such as music playing, calling, etc. The portable sound equipment is connectable with a base station to facilitate calling or directly connectable with an external server to realize and play sound data or connectable with another terminal by pairing to perform those functions.

There are ongoing developments on new portable sound equipment types having a design invented in consideration of portability which include a headphone-type sound equipment which is wearable on the user's head in a band shape and an earbud type which is insertedly wearable on the user's ear.

Such a neckband type configured to output sound and bendable in a C-shape to be wearable on the user's neck is one typical example of the portable sound equipment.

The C-shaped gentle curved body of the neckband type portable sound equipment is proper when worn on the user's neck. However, such the body has a disadvantage of occupying quite a space when taken off from the user's body.

To solve the disadvantage, a foldable portable sound equipment having a foldable body is suggested. The foldable sound equipment has the several bodies which are hingedly connected to be foldable.

In this instance, the hinge type foldable portable sound equipment has an exposed hinge, only to ruin the external beauty. The foldable portable sound equipment has no structure for stably connecting the bodies when folded or unfolded such that structural stability could be deteriorated disadvantageously.

SUMMARY OF THE DISCLOSURE

Accordingly, an object of the present invention is to address the above-noted problem of the unnecessary space and another problem that the portable sound equipment configured to receive an audio signal from a terminal and transmit a control signal for controlling the terminal might have a stably secured body when the body is folded or unfolded.

Embodiments of the present disclosure provide a portable sound equipment comprising: a support body formed in a gentle curve; electronic bodies provided in both ends of the support body, respectively, and exhaustible from the support body and rotatable to be folded or unfolded in a drawn-out state; and a hinge unit configured to provide a shaft for the rotation, wherein the hinge unit comprises a connection portion projected from one end of the support body; a hinge rotatably coupled to the connection portion; a cylinder connected to the hinge and loaded in the electronic body; and a hinge spring having one end fixed to the cylinder and the other end supporting the electronic body to generate a restoring force which makes the exhausted electronic bodies become drawn into the support body, and when the electronic bodies are drawn into the support body is caught in the connection portion with respect to the rotational direction.

The rotation of the electronic bodies may be restricted when the electronic bodies cover a predetermined area of the connection portion and the rotation may be facilitated when the exhausted electronic bodies exposes the area of the connection portion outside.

An outer circumference of the connection portion of the support body may be smaller than an inner circumference of an inner end of the electronic body.

An outer circumference of the connection portion of the support body may become larger inwardly to fixedly fit the electronic bodies in the support body when the electronic bodies are drawn a specific distance into the support body.

The portable sound equipment may further comprise a projected end formed in an outer circumference of an outer end of the support body and having the electronic bodies caught thereby, when they are drawn into the support body.

The portable sound equipment may further comprise a support ring coupled to one side of the cylinder and supporting one end of the hinge spring; and a support bracket fixedly coupled to an inner end of the electronic body and supporting the other end of the hinge spring.

The portable sound equipment may further comprise a rib provided in an inner surface of the electronic body; and a slit provided in an outer surface of the support bracket to be insertedly fitted to the rib.

The connection portion may further comprise an inclined area formed in a corresponding area to the electronic bodies, when the folded electronic bodies are unfolded, and configured to provide a force applied to the electronic bodies along the exhausted direction.

The support body may comprise an upper sheath; a lower sheath coupled to a lower end of the upper sheath; and a wire bracket provided between the upper sheath and the lower sheath and configured to fix a predetermined inner area of the connection portion.

The connection portion may comprise a ball bracket having the hinge insertedly fitted thereto; and a fixing bracket coupled to both sides of the ball bracket.

According to the embodiments of the present disclosure, the portable sound equipment may have following effects.

The portable sound equipment is capable of minimizing the space occupied by the folding process.

Furthermore, the portable sound equipment is capable of preventing the unfolded body from being unintendedly folded again.

Still further, the portable sound equipment is capable of keeping the unfolded state only by using the force applied in unfolding the portable sound equipment.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

DESCRIPTION OF SPECIFIC EMBODIMENTS

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Figure 1:
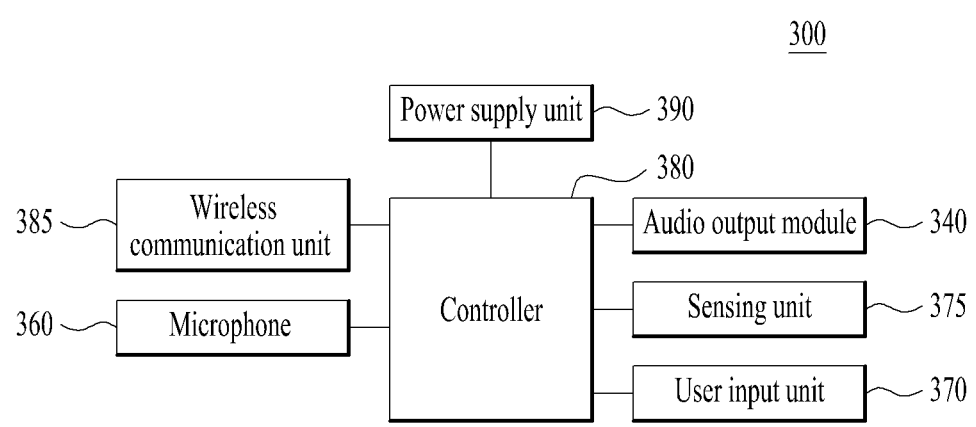
FIG. 1 is a block diagram of a portable sound equipment in accordance with one embodiment of the present disclosure.
Figure 2:
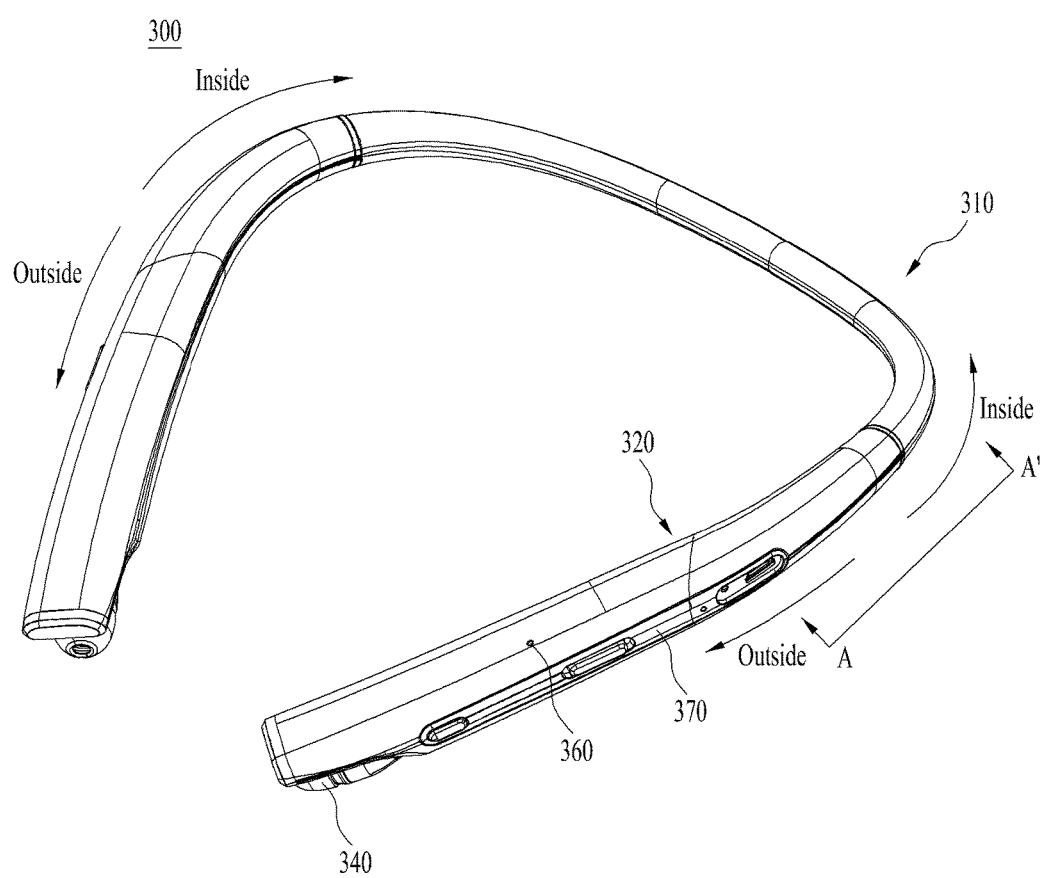
FIG. 2 is a perspective diagram of the portable sound equipment, viewed in one direction.
Figure 3:
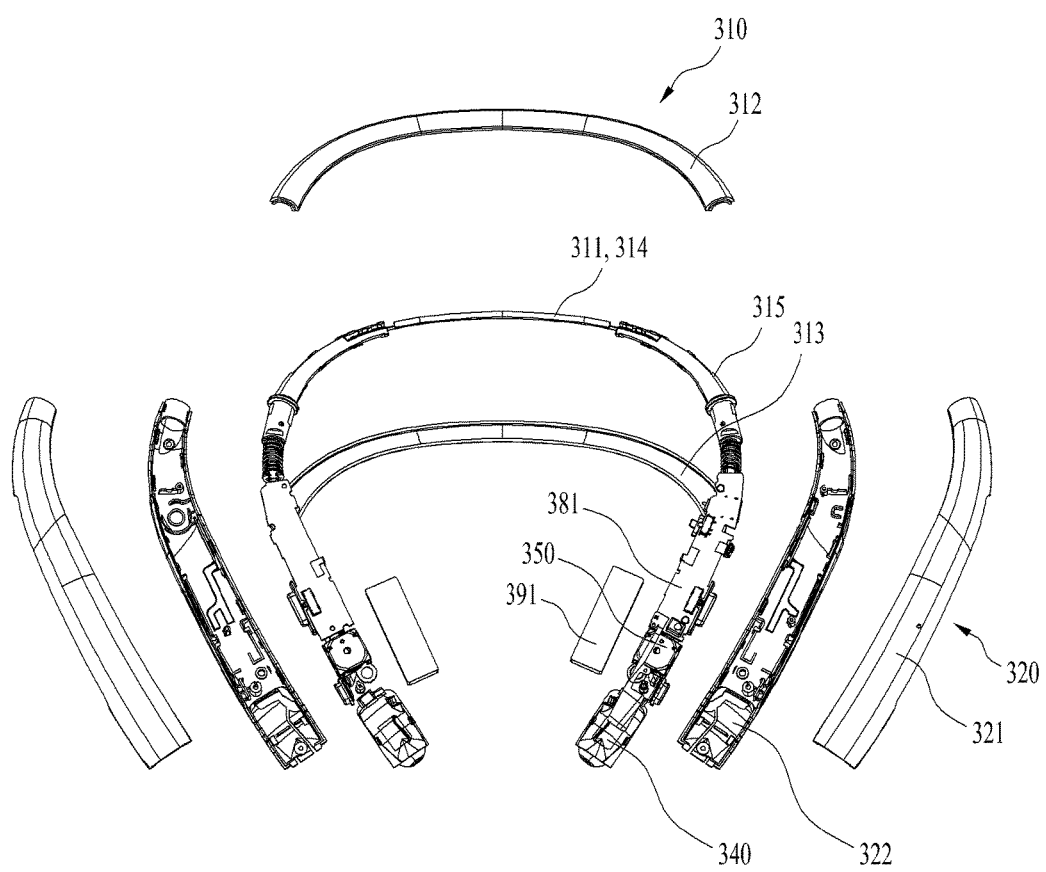
FIG. 3 is an exploded perspective diagram of the portable sound equipment.

FIG. 1 is a block diagram of a portable sound equipment in accordance with one embodiment of the present disclosure. FIG. 2 is a perspective diagram of the portable sound equipment, viewed in one direction. FIG. 3 is an exploded perspective diagram of the portable sound equipment. The drawings of FIG. 1 through 3 will be referred to together, for easy and convenient description of the present disclosure.

The portable sound equipment 300 includes a controller 380; a wireless communication unit 385; an audio output module 340; a sensing unit 375; a microphone 360; a user input unit 370; and a power supply unit 390.

The audio output module 340 is a mechanism configured to output sounds based on an audio signal and typical examples of the audio output module 340 include an earbud 340 which is insertedly wearable on a user's ear so as to deliver sounds.

The wireless communication unit 385 may be configured to receive an audio signal from an external terminal. The received audio signal is transmitted to an audio output module provided in the earbud 340 and output via the earbud 340 as sounds.

The microphone 360 is configured to process an external audio signal into electrical voice data. The processed voice data is transmitted to an external terminal or server via the wireless communication unit 385. Diverse noise canceling algorithms may be realized in the microphone 360 to cancel or remove the noise generated during the input process of the external audio signal.

The sensing unit 375 is a mechanism configured to recognize a state of and surroundings of the portable sound equipment 300. The sensing unit 375 may include an illuminance sensor configured to sense peripheral brightness; a touch sensor configured to sense a touch input; a gyro sensor configured to sense the tilt and location of the portable sound equipment; and an earbud switch configured to sense the presence of an earbud 340 in an earbud holder 325.

The user input unit 370 is provided as an input unit used by the user in controlling the portable sound equipment 300. The user input unit 370 may include a call button 372; a volume button 373; a power button 371; and a storage button 375 for storing the power button 371 and an audio cable 345 in an electronic body 320.

The buttons of the user input unit 370 may include only the call button and the pair of the volume buttons 373 or it may further include a play/stop button and a play list change button, rather than them. The size of the portable sound equipment 300 is limited and the user often makes inputs, without seeing the buttons directly. If many buttons are provided, it becomes difficult for the user to distinguish the functions of the buttons from each other. Accordingly, available input control commands may be expanded by combining the button pressing time and frequency and the limited number of the buttons.

The portable sound equipment 300 is kept on being worn on the user's body such that it may have little possibility of loss. In contrast, a conventional terminal often goes lost or missing such that the user input unit 370 may have an alarm function. As one example, when the user presses two buttons the user input unit 370 for a preset time period simultaneously, sounds an alarm on the external terminal connected with the portable sound equipment via Bluetooth to find out the terminal.

Moreover, the portable sound equipment 300 may activate a voice recording function of the external terminal connected via Bluetooth and store the voice collected via the microphone 360 in the external terminal.

The conventional portable sound equipment is able to control only the simple functions related with the calling or sound-media playing. However, the portable sound equipment in accordance with the embodiment of the present disclosure is characterized in that the expanded control range is expanded.

The body of the portable sound includes a support body 310 and an electronic body 320. As shown in FIG. 2, the body including the support body 310 and the electronic body 320 may form a C-shaped curve. The overall body has the C-shaped gentle curve or only the support body 310 has the C-shaped gentle curve. The support body 310 is the area which is worn on the user's neck and then the support body having the gentle curved shape can have an ergonomic structure for being worn on the user's neck stably.

The electronic body 320 may be provided in both ends of the support body 310 to form an electric control unit. As necessity occurs, the support body 310 may form the electric control unit in which electronic components are loaded. Those two elements are not necessarily distinguished from each other in functions.

The support body 310 has elasticity to be deformable in a preset range when a force is applied thereto and restitute when the applied force is removed. In case the distance between the electronic bodies 320 provided in both ends of the support body 310 is not wide enough for the neck to pass through, the electronic bodies 320 may be widened by using the elasticity of the support body 310 to be worn on the neck or taken off from the neck.

The shape and length of the support body 310 may be determined to minimize irritation when the user is wearing the portable sound equipment. As one example, the support body 310 may be provided in a curved cylinder shape or a twisted tape shape. The twisted-tape-shaped support body 310 has an inner surface supposed to be put on the back side of the neck and an outer surface put toward the back side. The connected portion between the support body 310 and the electronic body 320 may be twisted such that outer surfaces may be directed toward the user's front or upper side and inner surfaces of the electric control units 320 may be directed toward the user's back side or clavicle.

The electronic bodies 320 may be coupled to both ends of the support body 310 and then located in both ends of the C-shaped curve formed in the portable sound equipment. Diverse components such as the main board 381, the wireless communication unit 385, the battery 391 and the rotation module 350 may be inserted in the outer and inner portions of the electronic body 320.

The C-shaped portable sound equipment 300 may be worn on the user's neck and carried by the user. At this time, the sensing unit 375 provided in the portable sound equipment 300 is able to sense whether the user is wearing the portable sound equipment 300. As one example, the sensing unit 375 may be provided as a displacement sensor which is provided in the support body 310 to sense curvature variation of the support body 310. The displacement sensor is configured to sense whether the user widens the electronic bodies 320 located in the ends of the portable sound equipment 300, when the user tries to wear the portable sound equipment 300. In this instance, the curvature gently changes such that the displacement sensor can determine that the user tries to use the portable sound equipment 300 only to switch on the power or synchronize the portable sound equipment 300 with an external terminal.

To determine whether the user widens the ends so as to try to wear the portable sound equipment 300 or happens to widen the ends while carrying the portable sound equipment 300 more precisely, the displacement sensor may put the curvature after the curvature of the support body 310 changes drastically into consideration. When the curvature is consistent as a second size curvature after the curvature is changed into a first size curvature, the displacement sensor may determine that the user tries to wear the portable sound equipment 300. At this time, the second size curvature is gentler than a curvature of the rested portable sound equipment 300.

Rather than the displacement sensor, another sensor (e.g., a temperature sensor, an optical sensor or a hear rate sensor) provided on a wearing surface supposed to contact with the user's neck may be further provided and then determine the user's wearing when the temperature is within a body temperature range or the brightness becomes dark or a heart rate is sensed, only to switch one the power of the portable sound equipment 300 or synchronize the portable sound equipment 300 with an external terminal by implementing the wireless communication unit 385.

As another example, a physically pressing switch may be provided and generate an ON signal when the projected switch pressed by the user's neck after the user wearing the portable sound equipment 300. Hence, when the ON-state of the switch is maintained for a preset time period or more, the portable sound equipment 300 may be powered on or synchronized with an external terminal.

The plurality of the sensing units 375 and switches may be provided so as to determine the user's wearing by combining a plurality of values more precisely.

The electronic bodies 320 coupled to both ends of the support body 310 include an upper case 321 and a lower case 324. Between the upper case 321 and the lower case 324 may be loaded the main board 381, the wireless communication unit 385, the battery 391, the microphone 360 and the rotation module 350.

The electronic body 320 is fabricated by injection-molding a polymer material. As one example, such a polymer material may be plastic with intensity (e.g., polystyrene) or partially include a different material (e.g., metal, glass and leather).

The electric control unit 320 may be formed of the polystyrene with intensity so as to protect the internal electronic components and polyurethane may be coated on the surfaces of the electronic bodies 320 to closely contact with the user's body. when the polyurethane is coated on the surfaces of the electronic bodies 320, the portable sound equipment 300 may have the external appearance with uniformity and both the support body 310 and the electric control units 320 may contact with the user's skin so closely not to shake along the user's movement, such that the user can have an enhanced wearing sensation.

The portable sound equipment 300 which is wearable on the human body part is apt to be exposed to moisture such as sweat. When a water-proof function is added to the portable sound equipment 300, the durability of the portable sound equipment 300 may be enhanced. For that, a rib or a water-proof member for covering a gap between the upper case 321 and the lower case 324 may be formed to prevent moisture from permeating through the gap. Even without the auxiliary water-proof member, only the polyurethane collating may facilitate the close contact between the upper case 321 and the lower case 324.

The main board 381, the wireless communication unit 385, the microphone 360 and the like may be loaded in the electronic bodies 320 and they may be connected with the battery 391, the user input unit 370, the audio output module 340 and the like. The electronic components may be loaded in the electronic bodies 320 in symmetry or asymmetry. The electronic components loaded only in one electronic body 320 may be used via a signal wire loaded in the support body 310. As one example, when the wireless communication unit 385 is loaded in one electronic body 320, the audio signal received by the wireless communication unit 385 may be transmitted to both earbuds 340 via the signal wire.

The wireless communication unit 385 may include an antenna pattern 386 loaded in the main board 381 or formed in the surface of the electronic body 320 and configured to transceive a signal with an external terminal. Using a short range wireless communication method (e.g., Bluetooth), the wireless communication unit 385 may synchronize the portable sound equipment 300 with the external terminal to receive a control signal and an audio signal from the external terminal or transmit a control command and an audio signal input to the user input unit 370 or the microphone 360 to the external terminal.

The user input unit 370 of the electronic body 320 may include a power button for switching the power on and off; a button for calling or playing and a direction key for controlling an audio volume (the direction key is useable to play the next or former one of the currently playing music in the play list). The buttons may the dome keys which are physically pressed or the touch keys configured to sense capacity varication.

The location of the touch key may not be limited and the surface of the electronic body 320 may be used for the touch key. When the touch key is provided in the surface of the electronic body 320, LED may be provided in the area of the surface, where touch key is realized, to display the location and function of the touch key.

The earbud 340 may be insertedly worn on the user's ear and configured to deliver sounds. The earbuds 340 may be connected with the main board 381 via an audio cable 345. The audio cable 345 penetrates the electronic bodies 320 to connect the main board 381 with the earbuds 340 electrically. An audio output module (not shown) may be configured to generate sounds in the earbuds 340 directly. Such an audio output module means the configuration including a diaphragm.

The main board 381 is configured to control the earbuds 340 to output sounds based on the audio signal.

The audio cable 345 has one end connected with the earbuds 340 via the electronic bodies 320 and the other end with the main board 381 electrically so as to transmit the audio signal. Such the audio cable 345 may be exhausted from or embedded in the electronic bodies 320.

Figure 4:
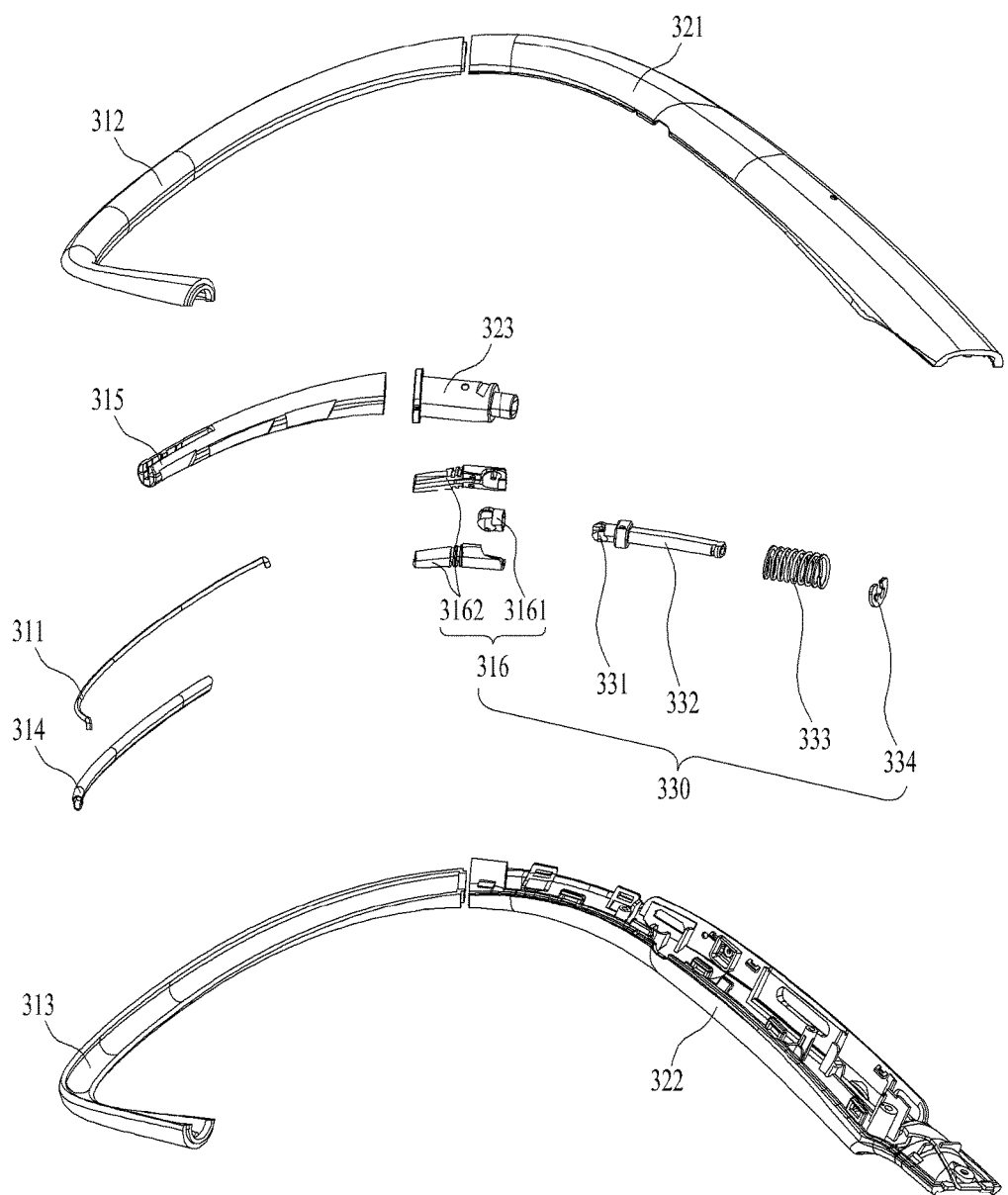
FIG. 4 is an exploded perspective diagram partially illustrating a portable sound equipment in accordance with another embodiment of the present disclosure.

FIG. 4 is an exploded perspective diagram partially illustrating a portable sound equipment in accordance with another embodiment of the present disclosure.

The support body 310 may include a shape memory alloy 311; an upper sheath 313; an inner sheath 314; a wire bracket 315; and a connection portion 316.

The shape memory alloy 311 has a property to restitute to a specific shape even when it is deformed. When the user widens the body by applying a force, the body 310 is deformed and then restored to the original shape. Accordingly, the shape memory alloy 311 may prevent the deformation or damage of the portable sound equipment 300.

The support body 310 may include sheaths 312, 313 and 314 for covering the shape memory alloy 311. The sheaths 312, 313 and 314 may be formed of Thermoplastic Poly Urethane. Such thermoplastic poly urethane is heated to fabricate the sheaths. When it is hardened, the thermoplastic poly urethane has oil—and-abrasion-resistance and elasticity like rubber.

The upper sheath 312 and the lower sheath 313 are coupled to each other to define the external appearance of the portable sound equipment 300. Accordingly, the upper sheath 312 and the lower sheath 313 may have a smaller elasticity and a larger strength than the inner sheath 314.

The inner sheath 314 may be coupled to the shape memory alloy 311 by double-injection molding.

The inner sheath 314 may cover the shape memory ally 311 and the signal wire to locate the shape memory alloy 311 at the connection portion 315 and fix the signal wire provided to transceive the signals of the electronic bodies 320. Both ends of the inner sheath 314 may be coupled to the pair of the wire brackets 315.

The shape memory alloy 311 may be exposed to both ends of the inner sheath 314 and the ends may be coupled to the wire brackets 315, respectively. The shape memory alloy 311 may have both ends which are bending like a hook to enhance the fixing force.

The wire brackets may be provided as counterparts to fix the signal wires stably and also to form the connection portion 316 which will be described in detail later. The wire brackets 315 may be coupled and covered in the upper and lower sheaths 312 and 313.

A predetermined area is overlapped with the support body 310 and another predetermined area of the connection portion 316 is overlapped with the electronic bodies 320 to form a hinge connection portion where a hinge 331 is coupled, which will be described later.

The electronic bodies 320 are repeatedly folded and unfolded with respect to the support body 310 such that the connection portion 316 provided adjacent to the electronic bodies 320 need not have a high durability, while a structure for fixing the connection portion 316 stably is required.

The connection portion 316 may be provided as the connecting among a hinge bracket 3161 having a hinge 331 coupled thereto and a fixing bracket 3162 which are coupled to both sides of the hinge bracket 3161. The hinge bracket 3161 allows the hinge to be coupled thereto easily and then the fixing bracket 3162 to be coupled thereto, such that the connection portion 316 may have the enhanced durability.

The hinge bracket 3161 may be formed of a flexible material for the coupling with the hinge 331. The hinge bracket 3161 becomes wider by a preset degree when the hinge 331 is coupled to the hinge bracket 3161 and then narrower after the coupled hinge 331 is stably seated, only to prevent the separation or getting loose of the hinge 331. For that, the hinge bracket 3161 may be formed of plastic or POM to have elasticity.

Alternatively, the connection portion 316 may be formed of one body molding. In this instance, the connection portion 316 may be provided as the connecting of the hinge brackets 3161 and the fixing bracket 3161, which is formed of POM.

The connection portion 316 may be primarily fixed by a wire bracket 315 and then secondarily fixed by the coupling of the upper and lower sheaths 312 and 3133, to be firmly fixed.

A predetermined area of the connection portion 316 may be covered by the electronic bodies 320 and one surface and the other surface of the other area of the connection portion 316 may be covered by the upper and lower cases 321 and 322.

Figure 5:
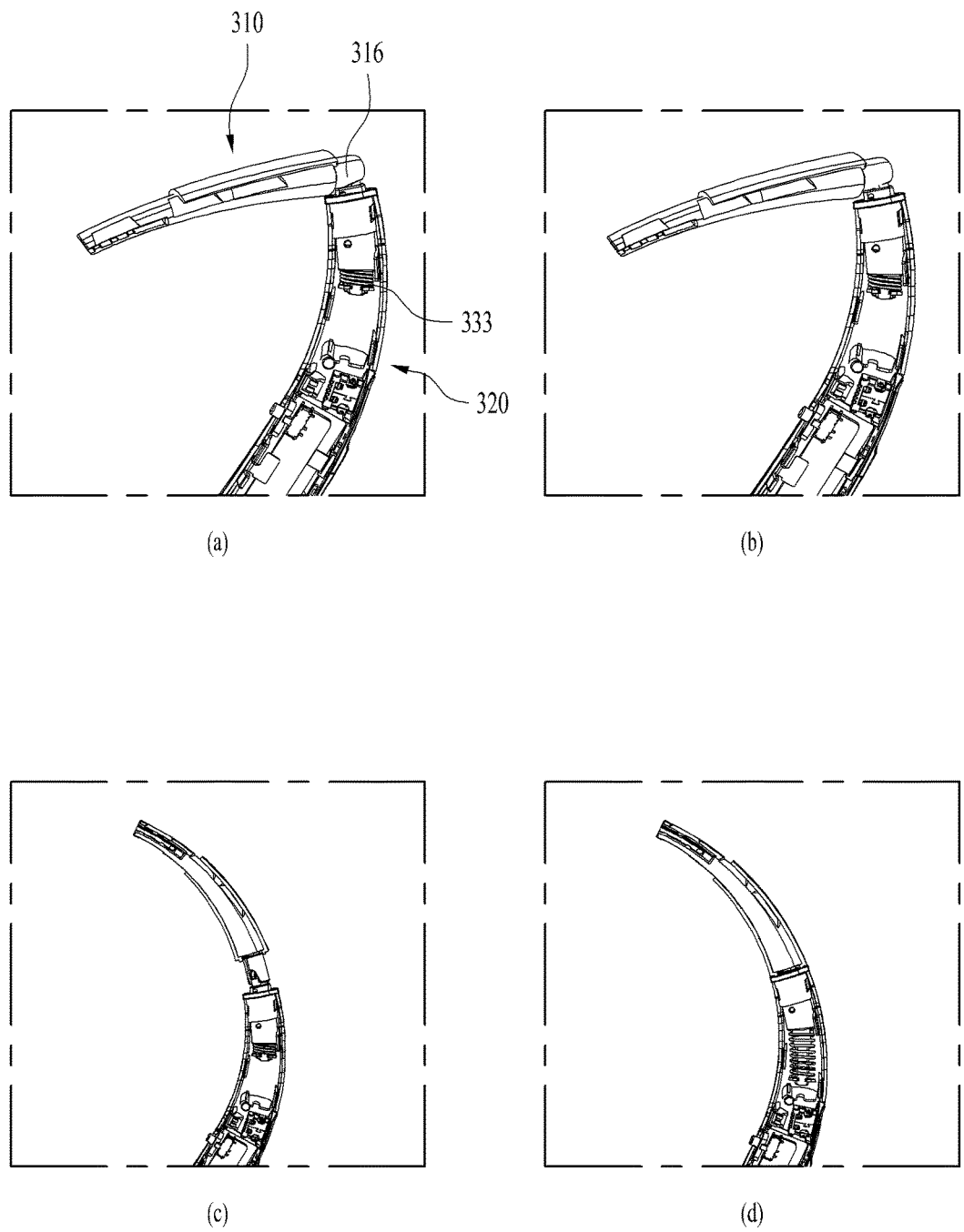
FIG. 5 is a diagram sequentially illustrating the portable sound equipment from a folded state to a unfolded state.

FIG. 5 is a diagram sequentially illustrating the portable sound equipment 300 from a folded state to an unfolded state.

A state shown in FIG. 5(a) shows a final folded state of the portable sound equipment 300 and a state shown in FIG. 5(b) shows a final unfolded state of the portable sound equipment 300.

In the state where the support body 310 and the electronic bodies 320 are folded as shown in FIG. 5(a), the electronic bodies 320 are drawn outwardly from a longitudinal direction to make the state shown in FIG. 5(b). In the state of FIG. 5(b), the electronic bodies 320 are rotated not to be caught in the support body 310, especially, the connection portion 316.

When the user grips and rotates the electronic bodies 320 and the support body 310 in the portable sound equipment 300 in the state of FIG. 5(b) to widen them, the portable sound equipment 300 becomes in a state of FIG. 5(c).

In the portable sound equipment 300 in the state of FIG. 5(c), the electronic bodies 320 are drawn toward the support body 310 by the elasticity of the hinge spring which will be described later, only to be stably in an unfolded state as shown in FIG. 5(d). Even a force is applied to the electronic bodies 320 to fold it along the rotation direction, the electronic bodies 320 in the state of FIG. 5(d) is able to keep the folded position not to be caught in the support body 310, especially, the connection portion 316 and folded again. Accordingly, the user is able to use the portable sound equipment 300 which is in the unfolded state of FIG. 5(d).

The folding process of the portable sound equipment 300 may be realized as the reverse process from the state of FIG. 5(d) to the state of FIG. 5(a).

The electronic bodies 320 which is in the state of FIG. 5(d) is exhausted from the support body 310 and make them be in the state of FIG. 5(c) to expose the connection portion 316. When the portable sound equipment 300 is in the state of FIG. 5(c) where the electronic bodies 320 are not caught in the connection portion 316, the user is able to rotate the electronic bodies 320 to fold them to be in the state of FIG. 5(b). When the user releases the electronic bodies 320 in the state of FIG. 5(b), the portable sound equipment 300 may be in the folded state of FIG. 5(a) by the elasticity of the hinge spring 333 which will be described later.

Hereinafter, the folding or unfolding mechanism of the support body 310 and the electronic bodies 320 mentioned above will be described in detail.

Figure 6:
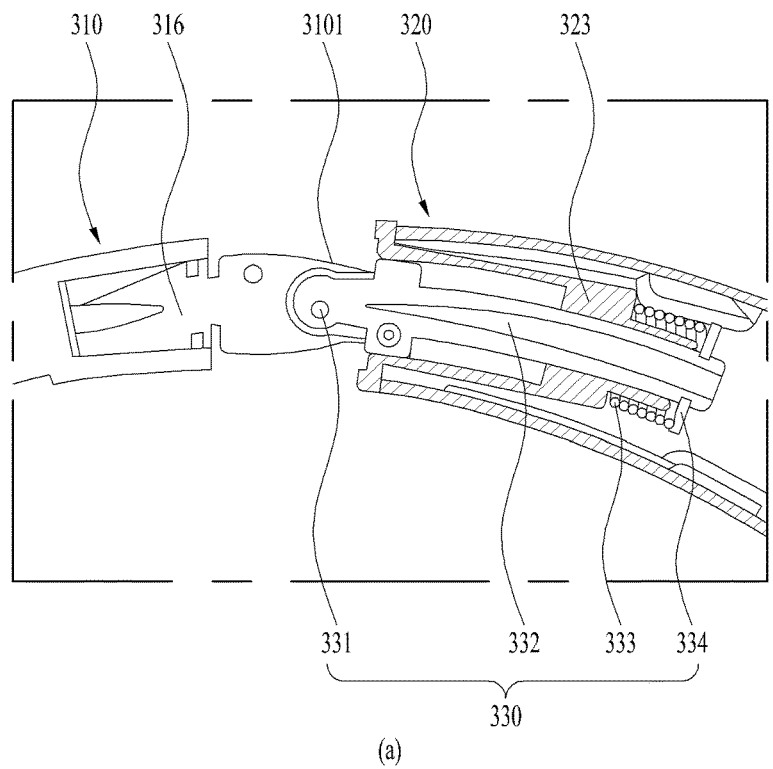
FIG. 6 is a partially sectional diagram of FIG. 2 along A-A'.
Figure 6:
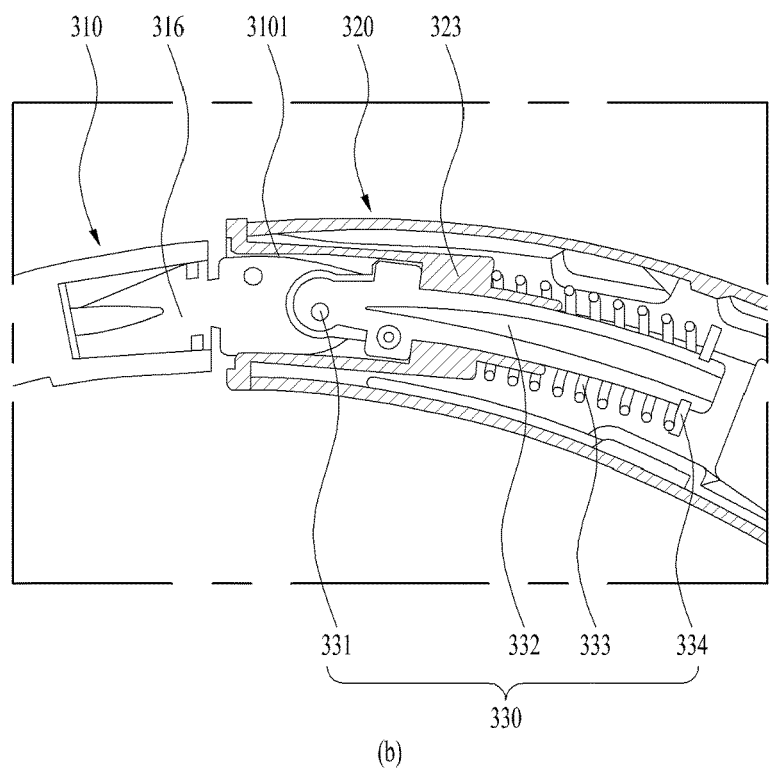

FIG. 6 is a partially sectional diagram of FIG. 2 along A-A'. For easy understanding, the partially exploded perspective diagram of the portable sound equipment 300 shown in FIG. 5 is referred together.

A hinge unit 330 is provided to hingedly couple the support body 310 and the electronic bodies 320 to each other. the hinge unit 330 is functioned to provide an axis on which the support body 310 and the electronic bodies 320 are folded or unfolded and assist the folding or unfolding mechanism from FIG. 5(d) to FIG. 5(a).

When they are drawn into the support body 310, the electronic bodies 320 may cover the connection portion 316 so as to restrict the rotation. When they are exhausted from the support body 310, the connection portion 316 is exposed outside and the electronic bodies 320 are rotated and folded without being caught in the connection portion 316.

The hinge unit 330 may include a hinge 331. The hinge 331 has a sphere and a projection projected in both directions of the sphere so as to facilitate a two-dimensional movement of the electronic bodies (e.g., the folding or unfolding on one plane) (not shown).

The support body 310, especially, the connection portion 316 may have a hinge bracket 3161 for coupling the hinge 331 thereto. The hinge bracket 3161 may be formed in a corresponding shape to the hinge 331.

A cylinder 332 may be connected with the hinge 331 and loaded in the electronic bodies 320. The cylinder 332 may be provided to fix a hinge spring 333, which will be described later, and provide a predetermined space for compressing or tensioning the fixed hinge spring 333.

The electronic bodies 320 are rotatable together with the rotation of the hinge 331 and the cylinder 332 to realize the folding or unfolding.

The hinge spring 333 ha one end which supports the cylinder 332 and the other end which supports the electronic body 320 to generate the restoring force applied to draw the electronic bodies 320 inwardly.

More specifically, one end of the hinge spring 333 may support the support ring 334 fixed to the cylinder 332 and the other end may support the support bracket 323 of the electronic body. As shown in FIG. 6(a), the restoring force generated by the compressing of the hinge spring 333 is applied to push the support ring 334 and the support bracket 323 such that the electronic bodies 320 can be drawn inwardly to cover the support body 310.

Figure 7:
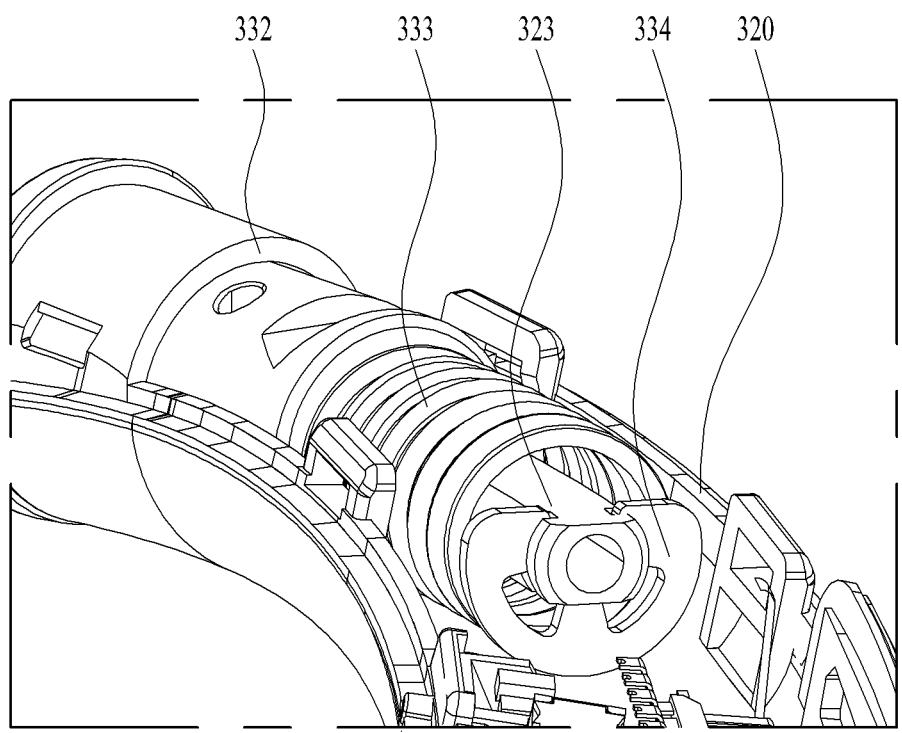
FIG. 7 is a front perspective diagram partially illustrating a portable sound equipment related with the present disclosure.

FIG. 7 is a front perspective diagram partially illustrating a portable sound equipment 300 related with the present disclosure.

The support ring 334 and the cylinder 332 may be integrally formed with each other or separately formed as independent elements. At this time, the support ring 334 may be fixedly coupled to one side of the cylinder 332. In case the support ring 334 is coupled as the independent element, the hinge spring 333 is inserted in the cylinder 332 and then the support ring 334 is fixedly coupled to the cylinder, only to facilitate the easy assembling process.

The support ring 334 may include an 'E'-shaped ring.

Figure 8:
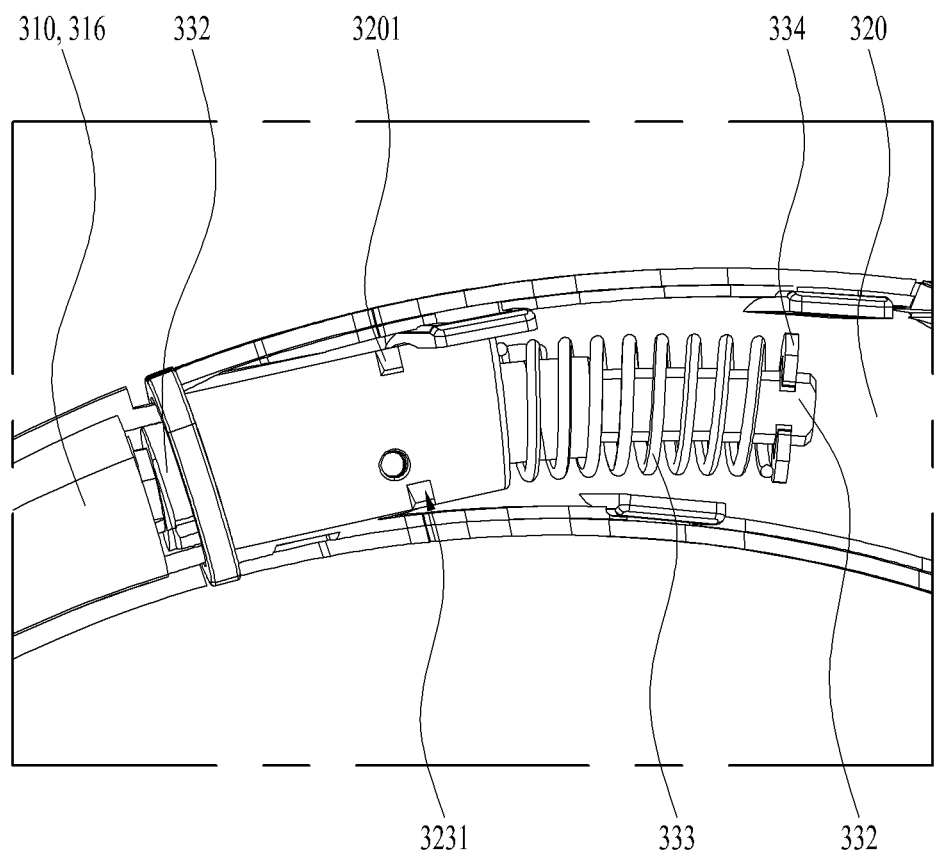
FIG. 8 is a front perspective diagram partially illustrating a portable sound equipment related with the present disclosure.

FIG. 8 is a front perspective diagram partially illustrating a portable sound equipment 300 related with the present disclosure.

The support bracket 323 supported by the other end of the support ring 334 may be fixedly coupled to the electronic body 320. The support bracket 323 and the electronic body 320 may be fixedly coupled to each other by using a slit 3231 and a rib 3201. The support bracket 323 may include the slit 3231 and the electronic body 320 may include the rib 3201. The support bracket 323 may be coupled to the electronic body 320 by coupling the slit 3231 to the rib 3201. The support bracket 323 may provide the surface supported by the other end of the hinge spring 333 and partially form an exterior appearance of an inner end of the electronic body 320.

Figure 9:
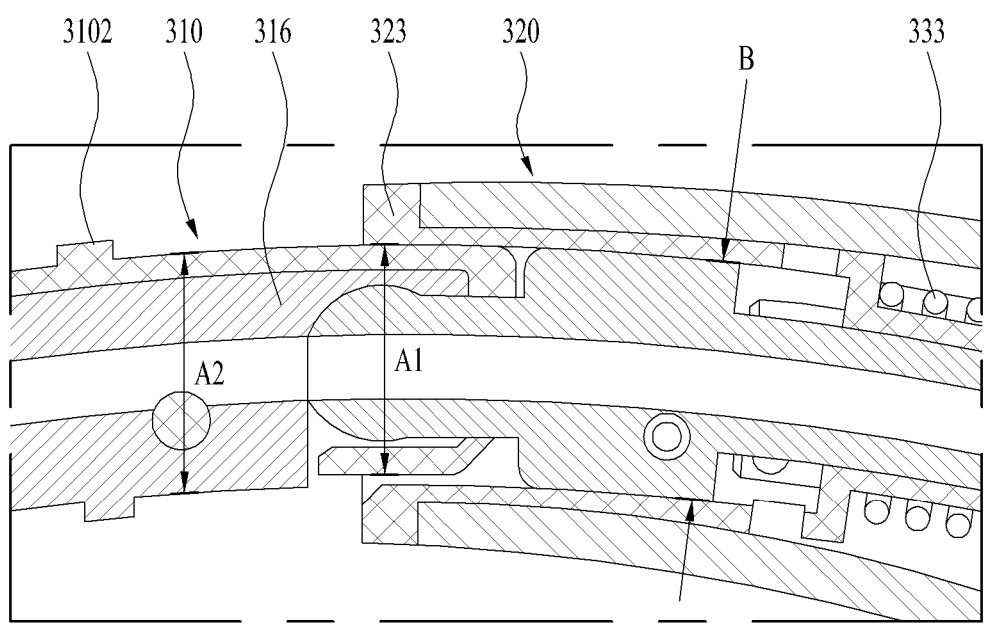
FIG. 9 is a sectional diagram of a portable sound equipment related with the present disclosure.

FIG. 9 is a sectional diagram of a portable sound equipment 300 related with the present disclosure.

One outer end of the support body 310, in other words, an outer circumference (A1 and A2) of the connection portion 316 may be smaller than an inner circumference (B) of the inner end of the electronic body 320 such that the electronic body 320 can define a sufficient space to be drawn into the support body 310.

Alternatively, the outer end of the support body 310, in other words, the outer circumference (A1 and A2) of the connection portion 316 may be equal to the inner circumference (B) of the inner end of the electronic body 320 at one point to be fixedly fitted to each other so as to fixedly couple the support body 310 and the electronic body 320 to each other. As one example, the outer end of the support body 310, in other words, the outer circumference of the connection portion 316 may become larger inwardly (A2>A1). The inner circumference (B) of the inner end of the electronic body 320 may be formed smaller than A2 and larger than A1 (A2>B>A1) such that the electronic body 320 can be caught while drawn into the support body 310.

As another example, the support body 310 may include a projected end 3102 formed in an outer end area. The projected end 3102 may be formed in the same position with an inner edge of the connection portion 316. The electronic body 320 may be fixedly caught by the projected end while drawn into the support body 310.

Figure 10:
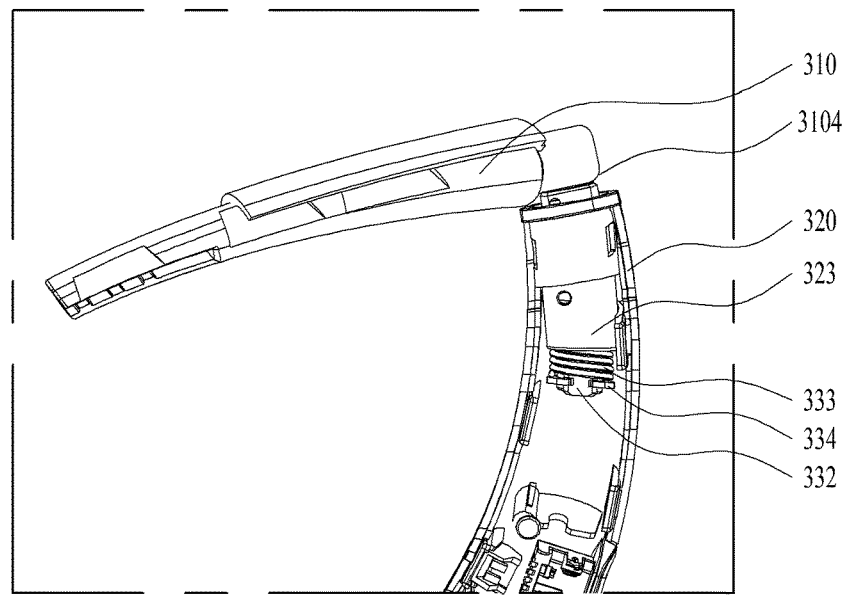
FIG. 10 is a diagram illustrating one example of a portable sound equipment related with the present disclosure.
Figure 10:
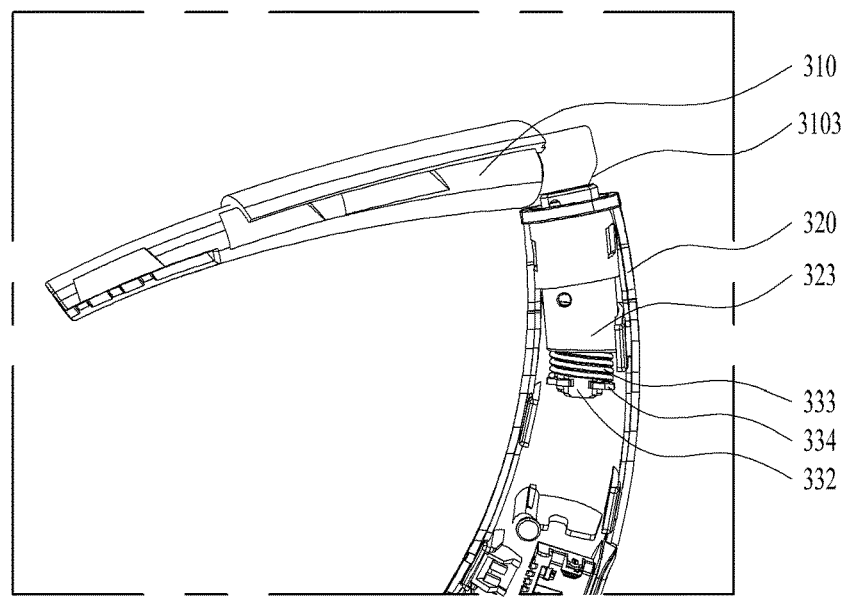

FIG. 10 is a diagram illustrating one example of a portable sound equipment 300 related with the present disclosure.

When the electronic bodies 320 and the support body 310 are unfolded, the electronic bodies 320 may be pulled a preset distance from the support body 310 to be unfolded. Such a process may make the user feel inconvenient.

To solve the inconvenience, the outer end of the support body 310 may include an inclined area 3103 as shown in FIG. 10(b). The inclined area 3103 may be formed in a corresponding area supposed to contact with the electronic bodies 320, when unfolding the electronic bodies 320. If the projected area 3104 is provided without the inclined area 3103 as shown in FIG. 10(a) when the electronic bodies 320 are unfolded in the folded state of the portable sound equipment 300, the electronic bodies 320 are caught by the projected area 3104 not to be unfolded. If the electronic bodies 320 are rotated and unfolded as shown in FIG. 10(b), the exhausting force along the direction of the exhausted electronic bodies 320 is generated by supporting the inclined area 3103 and the electronic bodies 320 may perform the rotational motion and the translational motion simultaneously. In other words, the pulling process along the exhaustion direction may be omitted as shown in FIGS. 5(a) and 5(b). Accordingly, the state of the portable sound equipment may be changed from the state of FIG. 5(a) to the state of FIG. 5(c) without the state of FIG. 5(b).

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims. Therefore all changes and modifications that fall within the metes and bounds of the claims, or equivalents of such metes and bounds, are therefore intended to be embraced by the appended claims.

What is claimed is:

1. A portable sound equipment comprising:
   a support body formed in a gentle curve;
   electronic bodies provided in both ends of the support body, respectively, and exhaustible from the support body so as to selectively switch a drawn-out state and a drawn-into state, wherein the electronic body is rotatable to be folded or unfolded in the drawn-out state; and
   a hinge unit configured to provide a shaft for the rotation, wherein the hinge unit comprises,
   a connection portion projected from one end of the support body;
   a hinge rotatably coupled to the connection portion;
   a cylinder connected to the hinge and loaded in the electronic body; and
   a hinge spring having one end fixed to the cylinder and the other end supporting the electronic body to generate a restoring force for the electric bodies from the drawn-out state to the drawn-in state, and
   wherein the electronic body is caught to the connection portion in case of the drawn-into state such that the electronic body is restricted to rotate.

2. The portable sound equipment of claim 1, wherein the rotation of the electronic bodies is restricted by the electronic bodies covering a predetermined area of the connection portion and the rotation is facilitated when the drawn-out electronic bodies exposes the area of the connection portion outside.

3. The portable sound equipment of claim 2, wherein an outer circumference of the connection portion of the support body is smaller than an inner circumference of an inner end of the electronic body.

4. The portable sound equipment of claim 2, wherein an outer circumference of the connection portion of the support body becomes larger inwardly to fixedly fit the electronic bodies in the support body when the electronic bodies are drawn a specific distance into the support body.

5. The portable sound equipment of claim 1, further comprising:
   a projected end formed in an outer circumference of an outer end of the support body and having the electronic bodies caught thereby, when they are drawn into the support body.

6. The portable sound equipment of claim 1, further comprising:
   a support ring coupled to one side of the cylinder and supporting one end of the hinge spring; and
   a support bracket fixedly coupled to an inner end of the electronic body and supporting the other end of the hinge spring.

7. The portable sound equipment of claim 6, further comprising:
   a rib provided in an inner surface of the electronic body; and
   a slit provided in an outer surface of the support bracket to be insertedly fitted to the rib.

8. The portable sound equipment of claim 1, wherein the connection portion further comprises,
   an inclined area formed in a corresponding area to the electronic bodies, when the folded electronic bodies are unfolded, and configured to provide a force applied to the electronic bodies along the exhausted direction.

9. The portable sound equipment of claim 1, wherein the support body comprises,
   an upper sheath;
   a lower sheath coupled to a lower end of the upper sheath; and
   a wire bracket provided between the upper sheath and the lower sheath and configured to fix a predetermined inner area of the connection portion.

10. The portable sound equipment of claim 1, wherein the connection portion comprises,
    a ball bracket having the hinge insertedly fitted thereto; and
    a fixing bracket coupled to both sides of the ball bracket.

* * * * *